(12) United States Patent
Wnuk et al.

(10) Patent No.: US 8,367,173 B2
(45) Date of Patent: Feb. 5, 2013

(54) DEGRADABLE SACHETS FOR DEVELOPING MARKETS

(75) Inventors: Andrew Julian Wnuk, Wyoming, OH (US); Scott Kendyl Stanley, Mason, OH (US); John Moncrief Layman, Liberty, OH (US); Robert Earl Magness, Lebanon, OH (US); Emily Charlotte Boswell, Cincinnati, OH (US); Lee Mathew Arent, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/287,338

(22) Filed: Nov. 2, 2011

(65) Prior Publication Data

US 2012/0107534 A1     May 3, 2012

Related U.S. Application Data

(60) Provisional application No. 61/409,255, filed on Nov. 2, 2010.

(51) Int. Cl.
*B29D 22/00* (2006.01)
*B29D 23/00* (2006.01)
*B32B 1/08* (2006.01)

(52) U.S. Cl. ............. 428/36.6; 428/34.1; 428/35.7; 428/35.8; 428/35.9; 428/36.7

(58) Field of Classification Search ............. 428/34.1, 428/35.7, 35.8, 35.9, 36.6, 36.7
See application file for complete search history.

(56) References Cited

U.S. PATENT DOCUMENTS 6,543,208 B1 * 4/2003 Kobayashi et al. ............. 53/452

\* cited by examiner

*Primary Examiner* — Michael C Miggins
(74) *Attorney, Agent, or Firm* — Brent M. Peebles (57) ABSTRACT

Disclosed herein are degradable sachets useful for enclosing a consumer product, such as, for example, shampoo, conditioner, soap, toothpaste, bar soap, and detergent. The sachets of the invention have a moisture vapor transmission rate (MVTR) of less than about ten grams per square meter per day ($g/m^2$/day) at 37° C. and 90% relative humidity (RH), and can disintegrate into pieces sufficiently small to pass through a one millimeter sieve, within two years after first and continuous exposure to water and microorganisms.

20 Claims, 3 Drawing Sheets

DEGRADABLE SACHETS FOR DEVELOPING MARKETS

CROSS REFERENCE TO RELATED APPLICATION

This application claims the benefit of U.S. Provisional Application No. 61/409,255 filed Nov. 2, 2010.

FIELD OF THE INVENTION

The invention relates to biodegradable sachets (i.e., small bags) useful for enclosing a consumer product, such as, for example, shampoo, conditioner, skin lotion, shave lotion, liquid soap, bar soap, toothpaste, and detergent.

BACKGROUND OF THE INVENTION

Polymers, such as polyethylene, have long been used as sachets (i e, small bags) for the packaging of products that have a short use cycle (e.g., less than about 12 months). Sachets are generally composed of multiple layers that include different types of materials to provide desired functionality, such as sealing, barrier, and printing. In food packaging, for example, a sachet is often used as a protective agent to package food, and is quickly disposed of after the contents are consumed. Sachets are also used to house a variety of consumer products that have a short use cycle, such as products for hair care, beauty care, oral care, health care, personal cleansing, and household cleansing. These sachets often enclose just enough product for a single use, and are often discarded as litter after that single use.

In developed parts of the world, the discarded sachets typically end up in a solid waste stream, which is incinerated or placed in landfills. In regions without modern solid waste infrastructure, used sachets are commonly discarded as litter on the soil and in surface waters. While some efforts at recycling the sachets have been made, the nature of the different polymers that compose the layers of the sachets, the presence of metals, the way the sachets are produced, and the way they are converted to products limit the number of possible recycling applications. For example, repeated processing of even pure polymers results in material degradation and, consequently, poor mechanical properties. In addition, the different grades of chemically similar plastics that are mixed during the recycling process can cause processing problems that make the reclaimed material inferior or unusable.

Some plastics manufacturers have introduced additives, such as oxo-biodegradable additives and organic materials, into traditional polymers (e.g., polyethylene, polypropylene, polystyrene, polyvinyl chloride) to promote biodegradation of the polymers in both aerobic environments (e.g., composting, soil) and anaerobic environments (e.g., landfills, sewage systems).

Oxo-biodegradable additives are often compounded into a polymer in a concentration of about 1 wt. % to about 5 wt. %, based on the total weight of the polymer, and consist of transition metals that theoretically foster oxidation and chain scission in plastics when exposed to heat, air, light, or a mixture thereof. The shortened polymer chains theoretically can be consumed by microorganisms found in the disposal environment and used as a food source. However, the fragmentation is not a sign of biodegradation, and there is no data to show how long these plastic fragments will persist in the soil or marine environments. Further, data have shown that moisture will retard the fragmentation process for months or longer. From a practical perspective, a plastic bag that is littered in the desert will probably fragment in a few months, but the fragments will persist for years or longer. If the same bag is littered in a cold, dark wet forest, it is unlikely that the bag will even fragment for months or years.

When organic materials, nonlimiting examples of which include, cellulose, starch, ethylene vinyl acetate, and polyvinyl alcohol, are used as additives in traditional plastics, some portion of the additive itself will biodegrade and generate carbon dioxide and methane. No data demonstrate that the remaining 95 wt. % to 99 wt. % of the traditional plastic will also biodegrade. The Biodegradable Products Institute (BPI) recommends that a supplier demonstrate that 90% of the entire plastic film or package, not just the additive, be converted to carbon dioxide under aerobic conditions, and carbon dioxide and methane under anaerobic conditions.

Sachets composed of biodegradable polymers seem to provide a solution to the problems described above, which are more efficacious or practical than recycling and/or the use of oxo-biodegradable and organic material additives. As used herein, the term "biodegradable polymers" are those that are capable of undergoing natural decomposition into carbon dioxide, methane, water, inorganic compounds, biomass, or a mixture thereof, in which the predominant mechanism is the enzymatic action of microorganisms that can be measured by standardized tests, in a specified time, reflecting relevant disposal conditions. In the presence of oxygen (aerobic biodegradation), these metabolic processes yield carbon dioxide, water, biomass, and minerals. Under anaerobic conditions (anaerobic biodegradation), methane may additionally be produced.

The attributes that render a polymer biodegradable, however, also may prevent it from being used for its intended purpose. Often, biodegradable polymers are moisture sensitive (i.e., can absorb significant amounts of water, swell, lose strength or thickness, or dissolve when exposed to aqueous media), thermally sensitive (i.e., have a melting point or glass transition temperature below about 65° C., or a Vicat softening point of less than about 45° C.), mechanically limited (i.e., a product formed from the polymer is too stiff, too soft, suffers from poor tensile strength or tear strength, or has insufficient elongation properties), and/or are difficult to process by conventional melt processes (e.g., cast film extrusion, blown film extrusion) into films. Properties such as tensile strength, tensile modulus, tear strength, and thermal softening point determine to a large extent how well a film will run on converting lines.

Biodegradable, metallized cellulose films (e.g., NatureFlex™ by Innovia LLC) have been used to form 12"×2" sachets that are capable of containing dry products in dry environments. However, these sachets have limited success when filled with liquid consumer products. For example, when these sachets were filled with water and allowed to sit overnight, visible cracking of the metallized film was observed, and the sachets failed within 24 hours, as evidenced by droplets visibly seeping through the film.

Degradable sachets suitable for containing a single serving of dry products, such as sugar, are also known. These sachets are composed of paper that is extrusion coated with a grade of MATER-BI™ thermoplastic starch film manufactured by Novamont.

Films composed of a biodegradable polymer layer are described in U.S. Patent Application Publication No. 2009/0286090, incorporated herein by reference. However, these films require high barrier properties to achieve their desired performance characteristics. To realize these high barrier properties, it is necessary to incorporate non-degradable materials (e.g., polyvinylidene chloride; polyvinyl alcohol;

polyvinyl acetate; polyolefins, such as polyethylene and polypropylene; polyamides; extrudable grade ethylene vinyl acetate; extrudable grade ethylene acrylic acid; ethylene vinyl alcohol copolymers (EVOHs) and combinations thereof, such as polyamide/EVOH/polyamide coextrusion) into the biodegradable polymer layer. Thus, these films are only partially biodegradable.

A fully degradable film that is a multilayer laminate is described in U.S. Patent Application Publication No. 2008/0038560, incorporated herein by reference. However, laminates are themselves undesirable because the lamination process is costly.

Japanese Patent Application 2005/111783, incorporated herein by reference, discloses packages with a resin composition of polylactic acid and lactic acid group co-polyesters upon which aluminum was vapor deposited. However, these films only degrade under industrial composting conditions and do not biodegrade in an open environment.

Polyhydroxyalkanoates (PHAs) also have been of general interest for use in forming biodegradable films. For example, U.S. Pat. No. 5,498,692, incorporated herein by reference, discloses a biodegradable film composed of a polyhydroxyalkanoate copolymer that has at least two randomly repeating monomer units. This film can be used to form, for example, grocery bags, food storage bags, sandwich bags, resealable Ziploc®-type bags, and garbage bags. PHA films or other biodegradable films may also be used to create a sachet, although a sachet comprising only PHA will not meet the barrier requirements for most consumer goods.

Although PHAs are biodegradable, their actual use as a plastic material has been hampered by their thermal instability. PHAs tend to have low melt strengths and may also suffer from a long set time, such that they tend to be difficult to melt process. Further, PHAs tend to undergo thermal degradation at very high temperatures (i.e., the temperatures that can be encountered during melt processing). Further still, PHAs have poor gas and moisture barrier properties, and are not well suited for use as packaging materials, as described in U.S. Patent Application Publication No. 2009/0286090, incorporated herein by reference.

None of the single use sachets that are currently in use and composed of a single layer of biodegradable polymers (i.e., no laminate) that can withstand the manufacturing process, have a long shelf life, meet barrier requirements, and biodegrade within a relatively short time period in an open environment.

SUMMARY OF THE INVENTION

Figure 1A:
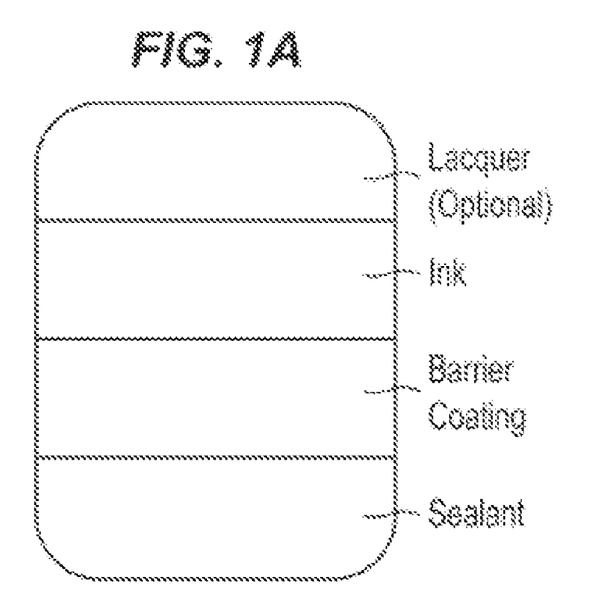
FIG. 1a depicts a structure suitable for a sachet package that includes a biodegradable sealant coated with a barrier material, upon which ink is deposited. Optionally, the ink is coated with a lacquer.

In one aspect, the invention relates to a package that includes a biodegradable sealant coated with a barrier material, upon which ink is deposited (see FIG. 1a). Optionally, the ink is coated with a lacquer. The sealant is present in a thickness of about 12 µm to about 100 µm, preferably about 25 µm to about 75 µm, more preferably about 30 µm to about 50 µm. The barrier material is selected from the group consisting of a metal, a metal oxide, a nanoclay, and mixtures thereof, and is present in a thickness of about 200 Å to about 50 µm, preferably about 200 Å to about 9 µm. The barrier material has a surface energy that is at least about 38 dynes/cm, preferably at least about 42 dynes/cm. Alternatively, the surface has an energy of less than about 38 dynes/cm but can be treated to result in the desired surface energy using techniques known to one skilled in the art, such as corona treatment. The ink is present in a thickness of about 0.5 µm to about 20 µm, preferably about 1 µm to about 10 µm, more preferably about 2.5 µm to about 3.5 µm. When present, the lacquer is has a thickness of up to about 25 µm, preferably up to about 5 µm.

In another aspect, the invention relates to a package that includes a layer composed of a biodegradable sealant and a barrier material selected from the group consisting of polyglycolic acid (PGA), polyolefin, a filler, and a mixture thereof. Ink is deposited on the layer and the ink is optionally coated with a lacquer (see FIG. 2a). The layer has a thickness of about 25 µm to about 100 µm, preferably about 30 µm to about 60 µm, and a surface energy of less than about 38 dynes/cm but can be treated to result in the desired surface energy using techniques known to one skilled in the art. The ink is present in a thickness of about 0.5 µm to about 20 µm, preferably about 1 µm to about 10 µm, more preferably about 2.5 µm to about 3.5 µm. When present, the lacquer has a thickness of up to about 25 µm, preferably up to about 5 µm. Optionally, the layer is coated with a barrier material before ink deposition. When present, the barrier material is present in a thickness of about 200 Å to about 50 µm, preferably about 200 Å to about 9 µm.

In yet another aspect, the invention relates to an article that includes a first package, which is composed of a biodegradable sealant, upon which ink is deposited. Optionally, the ink is coated with a lacquer. The first package is enclosed within a second package (see FIG. 3a). Optionally, a plurality of first packages are enclosed within the second package (see FIG. 3b).

The biodegradable sealant of the first package is present in a thickness of about 25 µm to about 100 µm, preferably about 30 µm to about 60 µm, and has a surface energy as previously described. The ink is present in a thickness of about 0.5 µm to about 20 µm, preferably about 1 µm to about 10 µm, more preferably about 2.5 µm to about 3.5 µm. Optionally, the first package is coated with a barrier material selected from the group consisting of a metal, a metal oxide, a nanoclay, and mixtures thereof, which is present in a thickness of about 200 Å to about 50 µm. This barrier material has a surface energy that is at least about 38 dynes/cm, preferably at least about 42 dynes/cm. Alternatively, the surface has an energy of less than about 38 dynes/cm but can be treated to result in the desired surface energy using techniques known to one skilled in the art.

The second package is composed of a substrate selected from the group consisting of polyethylene terephthalate, polyolefin, aluminum, metallized polyolefin, metallized polyethylene terephthalate, and a mixture thereof, and has a thickness of about 12 µm to about 200 µm. Optionally, the substrate includes a barrier material coating the substrate in a thickness of about 200 Å to about 50 µm, preferably about 200 Å to about 9 µm. Additionally or alternatively, the substrate optionally further includes a biodegradable sealant. Alternatively, the second package is composed of a biodegradable sealant that has a thickness of about 12 µm to about 100 µm, and which is coated with a barrier material selected from the group consisting of a metal, a metal oxide, a nanoclay, and a mixture thereof, which is present in a thickness of about 200 Å to about 50 µm. As another alternative, the second package is composed of a layer that has a thickness of about 12 µm to about 100 µm. This layer includes a biodegradable sealant, and a barrier material consisting of polyglycolic acid (PGA), polyolefin, a filler, and a mixture thereof in an amount of about 1 vol. % to about 40 vol. %, based on the total volume of the layer.

The packages and articles of the invention have a shelf life of at least about one year, preferably, at least about two years, more preferably at least about three years. After the packages of the first two aspects of the invention and the first package of the third aspect of the invention are used by, for example, a consumer, they are discarded into the open environment (i.e., not industrial composting conditions), where they are exposed to sealant-degrading microorganisms. After first, and continuous exposure to water and sealant-degrading microorganisms, these packages disintegrate into pieces sufficiently small to pass through a one millimeter sieve within two years, preferably within about eighteen months, more preferably within about one year.

The packages of the first two aspects of the invention and the second package of the third aspect of the invention have a MVTR of less than about 10 grams per square meter per day ($g/m^2/day$), preferably less than about 5 $g/m^2/day$, more preferably less than about 2 $g/m^2/day$, even more preferably less than about 1 $g/m^2/day$, still more preferably less than about 0.6 $g/m^2/day$, for example, less than about 0.4 $g/m^2/day$, or less than about 0.2 $g/m^2/day$, at about 37° C. and about 90% relative humidity (RH).

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

It has now been found that biodegradable sachets can be produced that withstand the manufacturing process, have a long shelf life, and when discarded into the open environment, disintegrate within a short time period into pieces small enough to fit through a 1 mm sieve after first and continuous exposure to water and sealant-degrading microorganisms. The sachets of the invention advantageously do not require industrial composting conditions for degradation. Further, they are composed of a single layer substrate with a coating and do not require costly, multiple lamination steps of different layers of materials. The relatively long shelf life of the sachets of the invention allow them to be stored or transported for a long period of time without a decrease in the physical and chemical integrity of the sachet, even when they contain liquid consumer products. The relatively fast biodegradation of the sachets results in a significant decrease in environmental litter. The films used to produce the sachets of the invention can advantageously be used to form other articles, such as, for example, trash bags, components of diapers, incontinence products, feminine hygiene products, food packaging, tubes, refill packs, and standup pouches. Further, the films used to produce the sachets of the invention are less dependent on petroleum-based feedstocks than the polyolefin fims that are traditionally used. Thus, the sachets of the invention may have a reduced carbon footprint when compared traditional sachets.

The sachets of the invention are composed of degradable films that can include both a sealant and a barrier material. The sealant of the invention provides bulk, heat sealing, and barrier protection properties. The barrier material functions to reduce the moisture vapor transmission rate (MVTR) into or out of the package, while still allowing its biodegradation. The barrier material can also serve to limit diffusion through the package wall of any diffusive species. Nonlimiting examples of diffusive species include $O_2$, $CO_2$, aroma, and perfume. Surprisingly, the specific combination of the sealant and barrier material of the invention functions to provide a suitably long shelf life of the sachet, protect the contents of the sachet from the outside environment, and impart a relatively low moisture vapor transmission rate to the sachet, while also allowing the sachet to undergo disintegration after first, and continuous exposure to water and sealant-degrading microorganisms, in less than two years, preferably less than about eighteen months, more preferably less than about one year.

In a first aspect, the invention relates to a package represented by FIG. 1a. In this aspect, the package includes a biodegradable sealant coated with a barrier material, upon which ink is deposited. Optionally, the ink is coated with a lacquer.

The sealant in this aspect of the invention can be any biodegradable polymer. In some embodiments, the sealant is selected from the group consisting of polyhydroxyalkanoate (PHA), PHA coated paper, PHA coated vacuum metallized paper, vacuum metallized PHA, polyvinyl alcohol, aliphatic aromatic polyesters (e.g., ECOFLEX® from BASF), thermoplastic starch films (e.g., MATER-BI™ from Novamont or PLANTIC® films from Plantic), polybutylene succinate and copolymers thereof (e.g., BIONOLLE® from Showa Highpolymer Co.), starch-based film, and mixtures thereof. Nonlimiting examples of the paper can include art paper (i.e., coated paper), kraft paper, rolled sheet, rice paper, cross paper, and paperboard. The addition of paper to the sealant adds bulk and stiffness to the sealant and can also improve the printing surface. In some preferred embodiments, the sealant is selected from the group consisting of PHA, PHA coated paper, and mixtures thereof For example, the sealant is PHA.

The PHA can be obtained as copolymers that are commercialized as film grades for extrusion and blowing from Shenzhen Ecomann Biotechnology Co., Meridian, Inc., which produces poly(beta-hydroxyalkanoate), poly(3-hydroxybutyrate-co-3-hydroxyvalerate (NODAX™), or Metabolix, which produces MIREL™. Nonlimiting examples of PHA copolymers include those described in U.S. Pat. No. 5,498,692. Other PHA copolymers can by synthesized by methods known to one skilled in the art, such as, from microorganisms, the ring-opening polymerization of beta-lactones, the dehydration-polycondensation of hydroxyalkanoic acid, and the dealcoholization-polycondensation of the alkyl ether of hydroxyalkanoic acid, as described in Volova, "Polyhydroxyalkanoates—Plastic Materials of the $21^{st}$ Century: Production, Properties, and Application, Nova Science Publishers, Inc., (2004), incorporated herein by reference.

The sealant in this aspect of the invention is present in a thickness of about 12 μm to about 100 μm, preferably about 25 μm to about 75 μm, more preferably about 30 μm to about 50 μm. For example, when the package encloses a liquid, the sealant is present in a thickness of about 30 μm to about 50 μm; and when the package encloses a powder, the sealant is present in a thickness of about 25 μm to about 40 μm. The thickness of the sealant, barrier material, substrate, and/or layer in any aspect of the invention can be determined by any method known to one skilled in the art, such as with standard calipers. A thinner sealant results in a package with a faster biodegradation rate, but a higher moisture vapor transition rate (MVTR), a decreased structural integrity, and a shorter shelf life. A thicker sealant results in a package with a lower MVTR and an increased structural integrity, but a slower biodegradation rate. Optionally, the sealant includes a filler in an amount of about 1 vol % to about 30 vol. %, based on the total volume of the sealant. Nonlimiting examples of the filler include graphene, graphene oxide, calcium carbonate, nanoclays and waxes.

The polarity of PHA and paper typically results in good bonding and that does not need to be improved. In some embodiments when the sealant is PHA or PHA coated vacuum metallized paper, however, anhydride or acid-modified ethylene and propylene homo- and co-polymers can optionally be used as extrudable adhesive layers, as described in U.S. Patent Application No. 2009/0191371, which is incorporated herein by reference, to improve bonding of the PHA to the paper layers. The exact compositions of the adhesive layers is determined according to the particular compositions of the adjoining layers to be bonded in a multilayer structure. One skilled in the polymer art can select the appropriate adhesive layer based on the other materials used in the structure. Adhesive layer compositions, such as, hot melt adhesives, solvent-based adhesives, and water-based adhesives are suitable.

The PHA also can be laminated to paper or foil, as described in U.S. Patent Application No. 2009/0191371. Lamination involves laying down a molten curtain of an adhesive composition between substrate and PHA film moving at high speeds (typically about 100 to about 1000 feet per minute, preferably about 300 to about 800 feet per minute) as they come into contact with a cold (chill) roll. The molten curtain is formed by extruding the adhesive composition through a flat die. Solution-based adhesive compositions may also be used to adhere the film to the substrate.

Nonlimiting examples of the adhesive can include acrylic, polyvinyl acetate, and other commonly used adhesive tie layers suitable for polar materials. In some embodiments, the adhesive is a renewable adhesive, such as BioTAK® by Berkshire Labels.

The exact composition and thickness of the barrier material in the first aspect of the invention is determined by the intended use of the package, and the sensitivity of the consumer product within the package to gaining or losing a certain material. For example, if the package encloses a shampoo, a critical amount of water loss from the shampoo will severely impact its performance. Based on the projected time that the package is expected to remain in the trade, a desired shelf life or expiration date is defined. With the known acceptable amount of water loss, length of time in the trade, and package size, an acceptable flux of water is then defined. The barrier material composition and barrier thickness is then chosen based on the particular performance criteria and characteristics of each consumer product that is enclosed within the package.

The barrier material in this aspect of the invention is selected from the group consisting of a metal, a metal oxide, a nanoclay, and a mixture thereof. In some embodiments when the barrier material is a metal or a metal oxide, it is selected from the group consisting of aluminum, an aluminum oxide, a silicon oxide, diamond-like carbon (DLC), and mixtures thereof. In some preferred embodiments, the metal is vacuum metallized aluminum. In some embodiments when the barrier material is a nanoclay, the nanoclay is selected from the group consisting of montmorillonites, vermiculite platelets, and mixtures thereof. The barrier material has a surface energy that is at least about 38 dynes/cm, preferably at least about 42 dynes/cm, or the barrier material can be treated to result in the desired surface energy using techniques known to one skilled in the art, such as corona treatment. The surface energy of the barrier material can be determined by any method known to one skilled in the art. If the surface energy is less than about 38 dynes/cm, the barrier material will not accept printing inks on its surface. The barrier material is present in a thickness of about 200 Å to about 50 μm, preferably about 200 Å to about 9 μm.

Figure 1B:
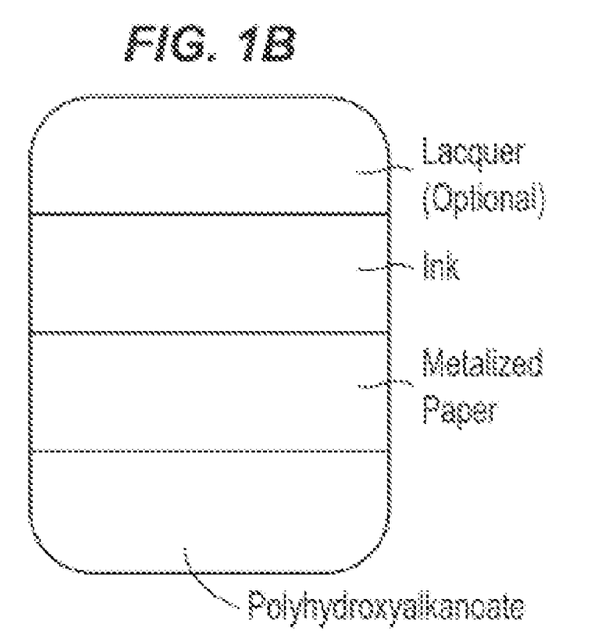
FIG. 1b depicts a structure suitable for a sachet package that includes polyhydroxyalkanoate as the sealant coated with metallized paper, upon which ink is deposited. Optionally, the ink is coated with a lacquer.

In one embodiment of this aspect of the invention, the degradable sealant is PHA and the barrier material is metallized paper, as shown in FIG. 1b.

Figure 2A:
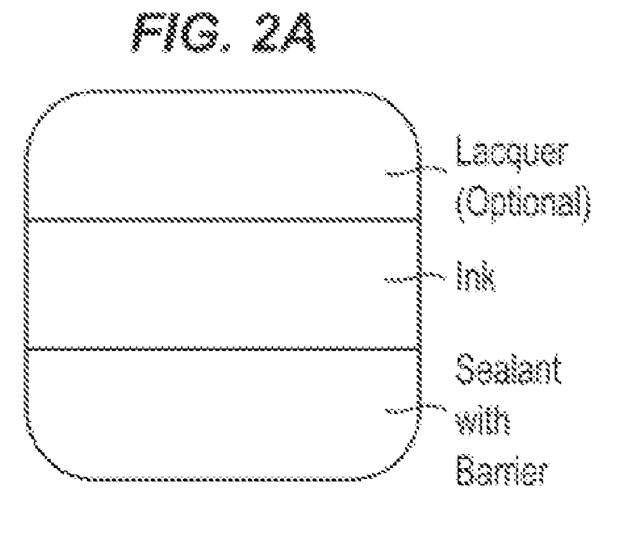
FIG. 2a depicts a structure suitable for a sachet package that includes a layer composed of a biodegradable sealant and a barrier material. Ink is deposited on the layer, and the ink is optionally coated with a lacquer.
Figure 2B:
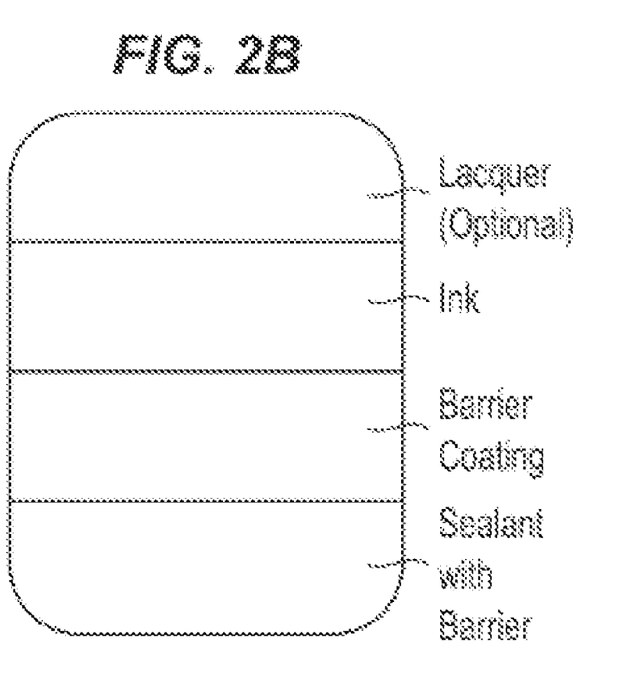
FIG. 2b depicts a structure suitable for a sachet package that includes a layer composed of a biodegradable sealant and a barrier material. The biodegradable sealant is coated with a barrier material, upon which ink is deposited. The ink is optionally coated with a lacquer.

In a second aspect, the invention relates to a package represented by FIG. 2a. In this aspect, the package includes a layer composed of a biodegradable sealant and a barrier material, selected from the group consisting of polyglycolic acid (PGA), polyolefin, a filler, and a mixture thereof. Ink is deposited on the layer, and the ink is optionally coated with a lacquer. In some embodiments, the layer is optionally coated with a barrier material, as shown in FIG. 2b.

The sealant in this aspect of the invention can be any biodegradable polymer. In some embodiments of this aspect of the invention, the sealant is as described in the first aspect of the invention.

The barrier material of the layer of this aspect of the invention is selected from the group consisting of a polyglycolic acid (PGA), polyolefin (e.g., polyethylene, polypropylene), and mixtures thereof. As used herein, the term "polyolefin" refers to a virgin, petroleum-based polyolefin, consumer recycled polyolefin, industrial recycled polyolefin, polyolefin derived from a renewable resource (i.e., produced by a natural process at a rate comparable to its rate of consumption, such as plants, animals, fish, bacterial, fungi, and forestry products), or a mixture thereof. In some embodiments of this aspect of the invention, the barrier material is a filler selected from the group consisting of a nanoclay, graphene, graphene oxide, calcium carbonate, wax, and mixtures thereof. Nonlimiting examples of the nanoclay include montmorillonites, vermiculite platelets, and mixtures thereof. In some preferred embodiments, the barrier material is selected from the group consisting of a nanoclay or graphene oxide.

The barrier material is present in an amount of about 1 vol. % to about 40 vol. %, preferably about 5 vol. % to about 40 vol. %, more preferably about 5 vol. % to about 20 vol. %, based on the total volume of the layer. A greater amount of barrier material results in increased structural integrity and a decreased MVTR, but may have a slower degradation rate.

The layer has a thickness of about 25 µm to about 100 µm, preferably about 30 µm to about 60 µm. For example, when the package encloses a liquid, the layer is present in a thickness of about 40 µm to about 60 µm. When the package encloses a powder, the layer is present in a thickness of about 25 µm to about 50 µm. A thinner layer results in a package that has a faster biodegradation rate, but a higher MVTR, decreased structural integrity, and a shorter shelf life. A thicker layer results in a package that has a lower MVTR and increased structural integrity, but a slower biodegradation rate. The layer has a surface that has an energy of at least about 38 dynes/cm, preferably at least about 42 dynes/cm, or that can be treated to result in the desired surface energy using techniques known to one skilled in the art, such as corona treatment. If the surface energy is less than about 38 dynes/cm, the layer will not accept printing inks on its surface. Exemplary embodiments of the composition of the layer include PHA/PGA, PHA/nanoclay, PHA/graphene, PHA/graphene oxide, and PHA/polyolefin.

The layer in this aspect of the invention can optionally be coated with a barrier material, as shown in FIG. 2b, the composition and thickness of which are as previously described in the first aspect of the invention.

Figure 3A:
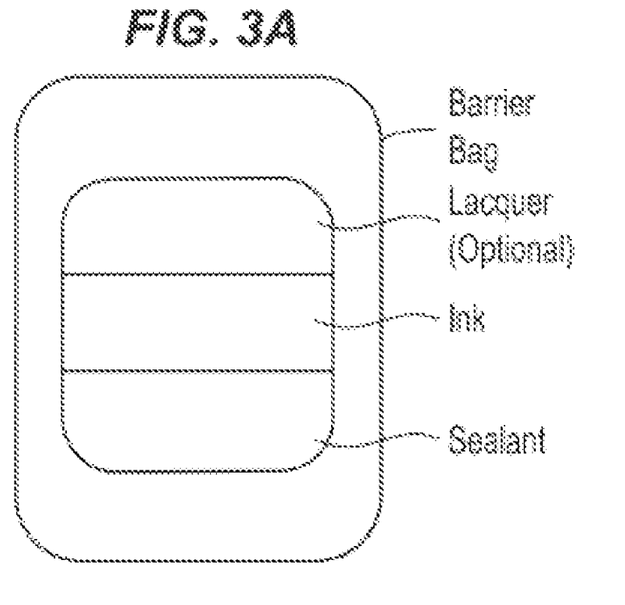
FIG. 3a depicts an article that includes a structure suitable for a sachet package, which is composed of a biodegradable sealant upon which ink is deposited. Optionally, the ink is coated with a lacquer. The structure is enclosed within a second, larger package.

In a third aspect, the invention relates to an article represented by FIG. 3a. In this aspect, the article includes a first package that is composed of a biodegradable sealant upon which ink is deposited. Optionally, the ink is coated with a lacquer. The first package is enclosed within a second, larger package.

The composition and thickness of the sealant of the first package is as previously described in the first aspect of the invention. The second package is composed of a substrate that has a thickness of about 12 µm to about 200 µm. Nonlimiting examples of the substrate of the second package include polyethylene terephthalate, polyolefins (e.g., high density polyethylene, low density polyethylene, polypropylene, biaxially oriented polypropylene), metallized polyolefin (e.g., metallized high density polyethylene, metallized low density polyethylene, metallized polypropylene, metallized biaxially oriented polypropylene), metallized polyethylene terephthalate, and aluminum. The thickness of the substrate depends on its composition and the barrier properties desired. One skilled in the art can easily determine the thickness of the substrate needed based on standard industry information. Optionally, the substrate includes a barrier material coating the substrate in a thickness of about 200 Å to about 50 µm, preferably about 200 Å to about 9 µm, as previously described in the first aspect of the invention. Additionally or alternatively, the substrate optionally further includes a biodegradable sealant, as previously described in the first aspect of the invention.

Alternatively, the second package is composed of a biodegradable sealant that has a thickness of about 12 µm to about 100 µm, and which is coated with a barrier material that has a thickness of about 200 Å to about 50 µm, as previously described in the first aspect of the invention. As another alternative, the second package is composed of a layer that has a thickness of about 12 µm to about 100 µm. This layer includes a biodegradable sealant and a barrier material in an amount of about 1 vol. % to about 40 vol. %, based on the total volume of the layer, as previously described in the second aspect of the invention.

Figure 3B:
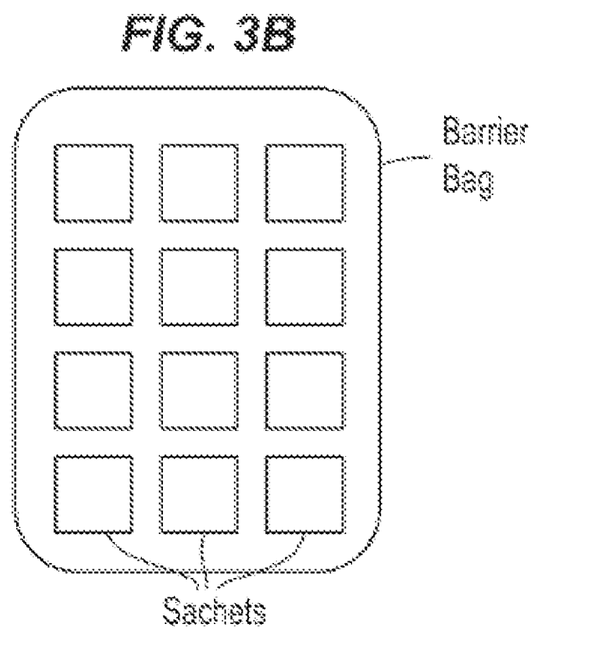
FIG. 3b depicts an article that includes a plurality of structures suitable for sachet packages, which are composed of a biodegradable sealant upon which ink is deposited. The plurality of structures are enclosed within a second, larger package.

Optionally, a plurality of first packages are contained within a single, second package, as shown in FIG. 3b. For example, a roll of small sachets are enclosed within a larger barrier bag that provides a barrier to the entire role of small sachets. Thus, the barrier requirements can advantageously be removed from numerous smaller sachets because it is provided by a single, larger package.

In all aspects of the invention, the ink that is deposited can be either solvent-based or water-based. In some embodiments, the ink is high abrasive resistant. For example, the high abrasive resistant ink can include coatings cured by ultraviolet radiation (UV) or electron beams (EB). In some embodiments, the ink is derived from a petroleum source. In some embodiments, the ink is derived from a renewable resource, such as soy, a plant, or a mixture thereof. Nonlimiting examples of inks include ECO-SURE!™ from Gans Ink & Supply Co. and the solvent-based VUTEk® and BioVu™ inks from EFI, which are derived completely from renewable resources (e.g., corn). The ink is present in a thickness of about 0.5 µm to about 20 µm, preferably about 1 µm to about 10 µm, more preferably about 2.5 µm to about 3.5 µm.

The optional lacquer in all aspects of the invention functions to protect the ink layer from its physical and chemical environment. In some embodiments, the lacquer is selected from the group consisting of resin, additive, and solvent/water. In some preferred embodiments, the lacquer is nitrocellulose-based lacquer. The lacquer is formulated to optimize durability and provide a glossy or matte finish. The lacquer is present in a thickness of up to about 25 µm, preferably up to about 5 µm. The amount of lacquer present affects the rate of degradation for the total package, not the rate of the degradation of the lacquer itself. Thus, a thinner lacquer layer results in a faster biodegradation rate for the total package.

In some embodiments, the biodegradable packages and articles of the invention are substantially free of oxo-biodegradable additives (i.e., less than about 1 wt. %, based on the total weight of the package or article). As previously described herein, oxo-biodegradable additives consist of transition metals that theoretically foster oxidation and chain scission in plastics when exposed to heat, air, light, or a mixture thereof. Although the shortened polymer chains theoretically can be consumed by microorganisms found in the disposal environment and used as a food source, there is no data to support how long these plastic fragments will persist in the soils or marine environments, or if biodegradation of these fragments occurs at all.

In some embodiments, the biodegradable packages and articles of the invention contain a consumer product, such as a liquid or a powder. As used herein, "consumer product" refers to materials that are used for hair care, beauty care, oral care, health care, personal cleansing, and household cleansing, for example. Nonlimiting examples of consumer products include shampoo, conditioner, mousse, face soap, hand soap, body soap, liquid soap, bar soap, moisturizer, skin lotion, shave lotion, toothpaste, mouthwash, hair gel, hand sanitizer, laundry detergent, dish detergent, dishwashing machine detergent, cosmetics, and over-the-counter medication. The packages and articles of the invention are resistant to the consumer product. As used herein, "resistant" refers to the ability of the packages and articles to maintain their mechanical properties and artwork on their surfaces, as designed, without degradation from consumer product interaction and diffusion of the consumer product through the package material.

CHARACTERIZATION

Shelf Life

The packages and articles of the invention have a shelf life of at least about one year, preferably at least about two years, more preferably at least about three years. As used herein, "shelf life" refers to a time period when the package or article of the invention maintains its original design intended properties, without deteriorating or becoming unsuitable for use. During the shelf life of the package or article of the invention, the physical and chemical integrity of the package and article are maintained throughout storage, shipment, and consumer use. The packages and articles of the invention maintain the above-described shelf lives when empty or filled with a consumer product, such as a liquid or a powder.

The shelf life of the package or article of the invention can be tested by placing the package or article into a constant temperature, constant humidity room to accelerate aging. Data from these studies can be used to predict longer term stability and chemical effects at non-accelerated conditions, such as shipping conditions. These data may be used to set shelf life with 80% confidence limits, using Arrhenius calculations, or other acceptable analysis techniques. For example, rate of aging may be accelerated two-fold for each ten degrees centigrade increase in temperature. A package or article placed in a room at 50% relative humidity (RH) and 55° C. for two months, is equivalent to a package or article at 50% RH and 25° C. for 16 months. After the accelerated aging process, the package or article is tested for weight loss and leakage, and the artwork is inspected for discoloration, bleeding, and the like. Relevant mechanical properties are also tested. If the package or article is the same as a control package or article that was not exposed to temperature and humidity, then the package or article is considered stable. If the package or article has physical properties or appearance that is reduced beyond a consumer acceptable level, then the package or article is considered a failure.

Biodegradation

After the package or article of the invention is used by, for example, a consumer, it is discarded into the open environment (i.e., not industrial compositing conditions). After first, and continuous exposure to water and sealant-degrading microorganisms, the packages of the first two aspects of the invention, and the first package of the third aspect of the invention disintegrate into pieces sufficiently small to pass through a one millimeter sieve, preferably through a 0.75 mm sieve, more preferably through a 0.5 mm sieve, for example, through a 0.25 mm sieve, within two years, preferably less than about eighteen months, more preferably less than about one year. As used herein, "microorganism" is defined as an organism that is too small to see with the naked eye, such as bacteria, fungi, archaea, and protists. For example, if the package or article of the invention is composed of PHA, then it can be depolymerized by microbial-derived enzymes.

Microorganisms secrete specific PHA depolymerases, which hydrolyse the polymer extracellularly to water-soluble products. Nonlimiting examples of bacteria that have been reported to degrade PHAs include bacteria of the genera *Bacillus, Pseudomonas* (e.g., *Pseudomonas lemoignei*), and *Streptomyces*. Other PHA-degrading bacteria can be found in Table 1 on page 454 of Jendrossek et al., Appl. Microbiol. Biotechnol. 46:451-463 (1996), which is incorporated herein by reference. PHA degrading bacteria are present in nearly all terrestrial and aquatic ecosystems. Nonlimiting examples of fungi that degrade PHA include *Ascomycetes, Basidiomycetes, Beuteromycetes, Mastigiomycetes, Myxomycetes, Zygomycetes*, as described in the aforementioned Jendrossek et al article.

During disintegration, the carbon compounds in the packages and articles of the invention undergo mineralization, while the inorganic material is dispersed. As used herein, "mineralization" is the conversion of carbon compounds into carbon dioxide, methane, or a mixture thereof. Mineralization can be determined by measuring the amount of organic carbon in the package or article that is converted to carbon dioxide, methane, or a mixture thereof. As used herein, "dispersed" refers to inorganic material breaking into small pieces capable of fitting through a particular size sieve (e.g., 1 mm)

Photoadditives

In addition, certain additives may be added to tune the degradability of polymers to meet the degradability specified in this invention. For example, numerous additives are known to tune the degradation of polymers with or without being triggered by some external stimulus (e.g. exposure to light) as disclosed in US 2010/0222454 A1, US 2004/0010051 A1, US2009/0286060 A1 and references therein. Additionally, Photodegradation, Photooxidation, and photostabilization of Polymers by Ranby and Rabek describe photodegradant materials.

While not wishing to be bound by theory, one example of these additives (photo acid or photobase generators) tune the local pH in response to exposure to certain wavelengths of light, that results in hydrolysis of a polyester. Once these polymers are hydrolyzed to a lower molecular weight, they are truly biodegraded by microorganisms.

Moisture Vapor Transmission Rate

The packages and articles of the invention have a moisture vapor transmission rate (MVTR) that minimizes the transfer of moisture through the package or article either to the outside environment, or to a consumer product inside the package. The MVTR is the steady state rate at which water vapor permeates through a film at specified conditions of temperature and relative humidity, and can be determined using ASTM F1249. When the consumer product is a liquid, the MVTR of the package or article prevents moisture loss from the liquid to the outside environment. When the consumer product is a powder, the MVTR of the package or article prevents absorption of moisture to the powder from the outside environment.

A package or article of the invention has a MVTR of less than about 10 grams per square meter per day ($g/m^2/day$), preferably less than about 5 $g/m^2/day$, more preferably less than about 2 $g/m^2/day$, even more preferably less than about 1 $g/m^2/day$, still more preferably less than about 0.6 $g/m^2/day$, for example, less than about 0.4 $g/m^2/day$ or less than about 0.2 $g/m^2/day$, at about 37° C. and about 90% relative humidity (RH). In some embodiments when the package or article of the invention encloses a powder, the MVTR is less than about 10 $g/m^2/day$, preferably less than about 5 $g/m^2/day$, more preferably less than about 2 $g/m^2/day$, for example, less than about 1 $g/m^2/day$ at about 37° C. and about 90% RH. In some embodiments when the package or article of the invention encloses a liquid, the MVTR is less than about 2 $g/m^2/day$, preferably less than about 1 $g/m^2/day$, more preferably less than about 0.6 $g/m^2/day$, for example, less than about 0.4 $g/m^2/day$ or less than about 0.2 $g/m^2/day$ at about 37° C. and about 90% RH. The MVTR of the packages and articles of the invention can be tuned by adjusting the composition and thickness of the sealant and barrier material of the package or article. For example, the MVTR decreases as the thickness of the sealant increases, and in particular, as the barrier material increases.

The packages and articles of the invention have no off odors, and also can be characterized by at least one the following expedients: tensile modulus, kinetic coefficient of friction, heat seal initiation temperature, heat seal strength, and tear resistance. As used herein, "off odor" refers to an noticeable odor that may be in any way unpleasing to a consumer.

Tensile Modulus

Tensile modulus is the stress divided by the strain in the linear region of the stress strain curve. In some embodiments, the tensile modulus of the packages and articles of the invention can be determined by ASTM D882, using a 15.0 or 25.4 mm wide film, a grip gap of about 50 mm, and a crosshead speed of about 300 m/min. In some embodiments, the packages and articles of the invention have a tensile modulus between about 140 MPa and about 4140 MPa. If the tensile modulus of the package or article of the invention is too low, then print distortion will be seen by the sonsumer from the packing process.

Kinetic Coefficient of Friction

The kinetic coefficient of friction is a dimensionless scalar value that describes the ratio of the force of friction between two bodies in relative motion to each other, and the force pressing them together. The kinetic coefficient of friction can be determined by ASTM D1894. In some embodiments, the packages and articles of the invention have a kinetic coefficient of friction of no greater than about 0.75, preferably no greater than about 0.5, between the outside surfaces of the package or article, and about 0.20 to about 0.75, preferably about 0.2 to about 0.5, between the inside surfaces of the package. If the kinetic coefficient of friction is too high, then the film is too tacky to be formed into a sachet.

Heat Seal Initiation Temperature

Heat seal initiation temperature is the minimum sealing temperature at which the peel strength of a seal achieves a value of 4 N. The heat seal initiation temperature can be determined by ASTM F88 using a 15.0 or 25.4 mm wide film, a dwell time of about 0.5 seconds, a pressure of about 2.5 bar, and a crosshead speed of about 200 mm/min In some embodiments, the packages and articles on the invention exhibit a heat seal initiation temperature of no greater than about 120° C., preferably no greater than 110° C. If the heat seal initiation temperature is too high then, it slows down the packing cycle time.

Heat Seal Strength

Heat seal strength is the peak force at which a one inch wide seal can be separated. The heat seal strength can be measured by ASTM F88 using 15 or 25.4 mm cut strips, a pressure of about 2.5 bar, a dwell time of about 0.5 seconds, a crosshead speed of 200 mm/min, and a temperature of about 180° C. In some embodiments, the packages and articles of the invention exhibit a heat seal strength of at least about 2000 N/m, preferably at least about 3000 N/m, more preferably at least about 4000 N/m. If the heat seal strength is too low, then the contents may leak from the package.

Tear Resistance

Tear resistance is the ability of the package or article to withstand tearing. Tear resistance can be measured by ASTM D1922 on the film material, and this is correlated to the ability of a consumer to easily open a package. In some embodiments, the packages and articles of the invention should exhibit a tear resistance of no greater than about 1000 mN. If the tear resistance is too high, then the package may be too difficult for a consumer to open.

Photostability

Photostability is the ability of the package or article of the invention to maintain its original design intended properties, without deteriorating or becoming unsuitable for use, when exposed to light (e.g., 320-800 nm). Light exposure includes near-UV and visible radiation to mimic manufacturing, packaging, distribution, retail display, and home storage. Light sources (near-UV and visible) may be tested together, using a single lamp source for near-UV and visible (e.g., xenon arc, metal halide and artificial daylight fluorescent) or separately using separate lamp sources for near-UV (e.g., UVA fluorescent) and visible (e.g., cool, white fluorescent) tested simultaneously or sequentially. Minimum exposure limits include 200 watt hours/square meter of near-UV radiation and 1.2 million lux hours of visible radiation.

METHOD OF MAKING

The films used to produce the packages and articles of the invention can be processed using conventional procedures for producing multilayer films on conventional coextruded filmmaking equipment. See, e.g., U.S. Pat. Nos. 5,391,423 and 5,939,467, which are each incorporated herein by reference. In general, polymers can be processed into films using either cast or blown film extrusion methods. See, e.g., Griff, "Plastics Extrusion Technology," $2^{nd}$ Ed., Van Nostrand Reinhold, 1976, which is incorporated herein by reference. Cast film is extruded through a linear slot die. Generally, the flat web is cooled on a large, moving polished metal roll. The film peels off this first roll, passes over one or more auxiliary cooling rolls, through a set of rubber-coated pull or "haul-off" rolls, and then to a winder.

In blown film extrusion, the melt is extruded upward through a thin annular die opening, a process referred to as tubular film extrusion. Air is introduced through the center of the die to inflate the tube, which causes it to expand. A moving bubble results, which is maintained at a constant size by controlling the internal air pressure. The tube of the film is cooled by blowing air through one or more chill rings surrounding the tube. The tube is then collapsed by drawing it into a flattening frame through a pair of pull rolls and into a winder.

Both cast film and blown film processes can be used to produce either monolayer or multilayer film structures. The production of monolayer films from a single thermoplastic material or blend of thermoplastic components requires only a single extruder and single manifold die. If a particular film requires a blend (e.g., sealant/barrier material, sealant/filler), pellets of the components first can be dry blended and then melt mixed in the extruder feeding that layer. Alternatively, if insufficient mixing occurs in the extruder, the pellets can be first dry blended and then melt mixed in a pre-compounding extruder, followed by repelletization prior to film extrusion.

Coextrusion processes are employed for the production of multilayer films. Such processes require more than one extruder and either a coextrusion feedblock or multi-manifold die system, or combination of the two, to achieve the multilayer film structure. The feedblock principle of coextrusion is described in U.S. Pat. Nos. 4,152,387, and 4,197,069, each incorporated herein by reference. Multiple extruders are connected to the feedblock, which employs moveable flow dividers to proportionally change the geometry of each individual flow channel in direct relation to the volume of polymer passing through the flow channels. The flow channels are designed such that the materials flow together at the same flow rate and pressure at their point of confluence, eliminating interfacial stress and flow instabilities. After the materials are joined in the feedblock, they flow into a single manifold die as a composite structure. The melt viscosities and melt temperatures of the materials should not differ too greatly; otherwise flow instabilities can result in the die leading to poor control of layer thickness distribution in the multilayer film, as described in U.S. Pat. No. 5,498,692.

An alternative to feedblock coextrusion is a multi-manifold or vane die as disclosed in aforementioned U.S. Pat. Nos. 4,152,387, 4,197,069, and in U.S. Pat. No. 4,533,30, incorporated herein by reference. Whereas in the feedblock system melt streams are brought together outside and prior to entering the die body, in a multi-manifold or vane die each melt stream has its own manifold in the die where the polymers spread independently in their respective manifolds. The melt streams are married near the die exit, with each melt stream at full die width. Moveable vanes provide adjustability of the exit of each flow channel in direct proportion to the volume of material flowing through it, allowing the melts to flow together at the same linear flow rate, pressure, and desired width. Because the melt flow properties and melt temperatures of the processed materials may vary widely, use of a vane die has several advantages. The die lends itself toward thermal isolation characteristics wherein materials of greatly differing melt temperatures, for example up to 80° C., can be processed together.

Each manifold in a vane die can be designed and tailored to a specific polymer. This allows materials with greatly differing melt viscosities to be coextruded into multilayer films. In addition, the vane die also provides the ability to tailor the width of individual manifolds, such that an internal layer, can be completely surrounded by water insoluble materials leaving no exposed edges susceptible to water. The aforementioned patents also disclose the combined use of feedblock systems and vane dies to achieve more complex multilayer structures.

The films that are produced by the aforementioned processes can be converted into the packages and articles of the invention using a form-fill-seal process. A traditional process typically involves three successive steps where the package or article is formed from the film structure, filled, and then sealed or closed, as described in U.S. Pat. No. 6,293,402, which is incorporated herein by reference. In heat sealing methods, a temperature range exists above which the seal would be burnt, and below which the seal would not be sufficiently strong.

Seals are provided by any sealing means known to one skilled in the art. Sealing can comprise the application of a continuously heated element to the film, and then removing the element after sealing. The heating element can be a hot bar that includes jaws or heated wheels that rotate. Different seal types include fin seals and overlap seals.

Single Lane Process

A well-known sealing single lane process using a vertical form and fill machine is described in U.S. Pat. No. 4,521,437, incorporated herein by reference. In this process, a flat web of synthetic thermoplastic film is unwound from a roll and formed into a continuous tube by sealing the longitudinal edges on the film together to form a lap seal (i.e., fin seal). The resulting tube is pulled vertically downwards to a filling station, and collapsed across a transverse cross-section of the tube, the position of such cross-section being at a sealing device below the filling station. A transverse heat seal is made by the sealing device at the collapsed portion of the tube, thus making an air tight seal across the tube. After making the transverse seal, a pre-set volume of material to be packaged, e.g. flowable material, enters the tube at the filling station, and fills the tube upwardly from the aforementioned transverse seal. The tube is then dropped a predetermined distance under the influence of the weight of the material in the tube, and of the film advance mechanism on the machine. The jaws of the sealing device are closed, collapsing the tube at a second transverse section, which is above the air/material interface in the tube. The sealing device seals and severs the tube transversely at said second transverse section. The material-filled portion of the tube is now in the form of a pillow shaped sachet. Thus, the sealing device has sealed the top of the filled sachet, sealed the bottom of the next-to-be-formed sachet, and separated the filled sachet from the next-to-be-formed sachet, all in one operation.

Multilane Process

The packages of the invention can also be processed using a multilane sachet packaging machine, such as the VEGA PACK 300S by QuadroPack. A high-speed, multi-lane sachet processing machine is also described in U.S. Pat. No. 6,966,166, incorporated herein by reference. The machine used in this process includes two rolls for dispensing sheets of webbed film of equal dimensions, a plurality of sealing devices appropriate for such film, and means, such as the pump station described below for inserting contents (e.g., liquid, viscous materials, other substances) into the film packages. A plurality of packages can be produced by utilizing one or more moveable reciprocating carriages that travel with the flow of film through the machine, the carriages supporting each of the sealing and cross cutting stations. The sealing devices are applied to all but one of the edges, forming a pouch with a cavity and an opening. The desired contents of the package are inserted into the cavity through the opening. The opening is then sealed and separated from the film.

A pair of film rolls is provided at the film roll station. Alternatively, a cutter can be placed at a middle of a single nip roller to divide the film width into two equal parts. Sheets of film are advanced through the apparatus by the pull-wheel station and used to form the front and back panels of the package. The film from each roll is guided so that the two sheets of film are in close proximity to, and in a parallel relationship with, one another when they are advanced through the machine.

The sealing and cutting devices include: longitudinal sealing bars to seal the package's vertical sides, a unidirectional roller to hold the film in position and prevent it from sliding backward, a vertical cutter to cut a tear-off slit into the package in the vertical direction, and cross sealing bars to seal the packages in horizontal direction.

The pump station comprises of a plurality of fill dispensers in communication with a storage structure containing the consumer product into the package. These dispensers are capable of drawing a pre-determined quantity of consumer product from a reservoir and depositing it into the cavities of the film packages formed by the machine. In the preferred embodiment, the pump station and dispensers may be driven by one or more motion-controlled servomotors in communication with the cam system. The quantity of consumer product may be changed by exchanging the dispensers (with different dispensers having more or less capacity), changing the stroke of the pump cycle, changing the timing of the pump cycle, and the like. Therefore, different quantities of consumer products can be dispensed, depending upon the size and capacity of the packages to be formed by the machine.

A preferred embodiment of this invention is a PHA sealant layer with vacuum metallization barrier layer, which is adhesively laminated to a reverse printed PHA outerlayer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A package comprising:
   (a) a biodegradable sealant having a thickness of about 12 μm to about 100 μm;
   (b) a barrier material selected from the group consisting of a metal, a metal oxide, a nanoclay, and a mixture thereof coating the sealant, wherein the barrier material has a thickness of about 200 Å to about 50 μm and a surface that has an energy of at least about 38 dynes per centimeter (dyne/cm), or that is treatable to an energy of at least about 38 dyne/cm; and,
   (c) ink deposited on the barrier material, and having a thickness of about 1 μm to about 20 μm;
   wherein the package has a moisture vapor transmission rate (MVTR) of less than about 10 grams per square meter per day (g/m²/day) at 37° C. and 90% relative humidity (RH);
   wherein the package has a shelf life of at least about one year when containing a liquid consumer product; and,
   wherein the package, within two years after first and continuous exposure to water and sealant-degrading microorganisms, disintegrates into pieces sufficiently small to pass through a one millimeter sieve.

2. The package of claim 1, wherein the biodegradable sealant is selected from the group consisting of polyhydroxyalkanoate (PHA), PHA coated paper, PHA coated vacuum metallized paper, vacuum metallized PHA, polyvinyl alcohol, aliphatic aromatic polyesters, thermoplastic starch, polybutylene succinate, copolymers of polybutylene succinate, starch-based film, and mixtures thereof.

3. The package of claim 1, wherein the biodegradable sealant is selected from the group consisting of PHA PHA coated paper, PHA coated vacuum metallized paper, vacuum metallized PHA, and mixtures thereof.

4. The package of claim 1, wherein the package has a shelf life of at least about two years.

5. The package of claim 1, wherein the package disintegrates into pieces sufficiently small to pass through a one millimeter sieve, within 18 months after first and continuous exposure to water and sealant-degrading microorganisms.

6. The package of claim 1, wherein the ink is selected from the group consisting of petroleum-based ink, soy-based ink, plant-based ink, or mixtures thereof.

7. The package of claim 1, wherein the package comprises less than about 1 wt. % of an oxo-biodegradable additive.

8. The package of claim 1, wherein the sealant further comprises a filler in an amount of about 1 vol. % to about 30 vol. %, based on the total volume of the sealant.

9. The package of claim 8, wherein the filler is selected from the group consisting of nanoclay, graphene, graphene oxide, calcium carbonate, wax, and mixtures thereof.

10. The package of claim 1 further comprising a lacquer coating the ink, and having a thickness of up to about 25 μm.

11. The package of claim 10, wherein the lacquer is selected from the group consisting of resin, additive, solvent/water, and mixtures thereof.

12. The package of claim 1, wherein the package encloses a consumer product and is resistant to the consumer product.

13. The package of claim 12, wherein the consumer product is a liquid and the package has a MVTR of less than about 2 g/m²/day.

14. The package of claim 12, wherein the consumer product is a powder and the package has a MVTR of less than about 5 g/m²/day.

15. A package comprising:
   (a) a layer comprising a mixture of:
      (i) a biodegradable sealant, and
      (ii) a barrier material selected from the group consisting of polyglycolic acid (PGA), polyolefin, a filler, and a mixture thereof in an amount of about 1 vol. % to about 40 vol. %, based on the total volume of the layer,
   wherein the layer has a thickness of about 25 μm to about 100 μm, and a surface that has an energy of at least about 38 (dyne/cm), or that is treatable to an energy of at least about 38 dyne/cm; and,
   (b) ink deposited on the layer, and having a thickness of about 1 μm to about 20 μm;
   wherein the package has a moisture vapor transmission rate (MVTR) of less than about 10 g/m²/day at 37° C. and 90% RH;
   wherein the package has a shelf life of at least about one year when containing a liquid consumer product; and,
   wherein the package, within two years after first and continuous exposure to water and sealant-degrading microorganisms, disintegrates into pieces sufficiently small to pass through a one millimeter sieve.

16. The package of claim 15 further comprising a barrier material selected from the group consisting of a metal, a metal oxide, a nanoclay, and a mixture thereof coating the layer, wherein the barrier material has a thickness of about 200 Å to about 50 μm and a surface that has an energy of at least about 38 dynes per centimeter (dyne/cm), or that is treatable to an energy of at least about 38 dyne/cm.

17. An article comprising,
   (a) a first package comprising:
      (i) a biodegradable sealant that has a thickness of about 12 μm to about 100 μm, and a surface that has an energy of at least about 38 dyne/cm, or that is treatable to an energy of at least about 38 dyne/cm; and,
      (ii) ink deposited on the sealant, and having a thickness of about 1 μm to about 20 μm; and,
   (b) a second package enclosing the first package comprising at least one of:
      (i) a substrate selected from the group consisting of polyethylene terephthalate, polyolefin, aluminum, metallized polyolefin, metallized polyethylene terephthalate, and a mixture thereof, and having a thickness of about 12 μm to about 200 μm;
      (ii) a biodegradable sealant having a thickness of about 12 μm to about 100 μm and a barrier material selected from the group consisting of a metal, a metal oxide, a nanoclay, and a mixture thereof coating the sealant, wherein the barrier material has a thickness of about 200 Å to about 50 μm; and (iii) a layer having a thickness of about 12 μm to about 100 μm comprising a biodegradable sealant, and a barrier material selected from the group consisting of polyglycolic acid (PGA), polyolefin, a filler, and a mixture thereof, in an amount of about 1 vol. % to about 40 vol. %, based on the total volume of the layer;

wherein the second package has a moisture vapor transmission rate (MVTR) of less than about 10 g/m$^2$/day at 37° C. and 90% RH;

wherein the first package, within two years after first and continuous exposure to water and sealant-degrading microorganisms, disintegrates into pieces sufficiently small to pass through a one millimeter sieve; and, wherein the article has a shelf life of at least about one year when the first package contains a liquid consumer product.

18. The article of claim 17, wherein a plurality of first packages are enclosed within the second package.

19. The article of claim 17, wherein the first package disintegrates into pieces sufficiently small to pass through a one millimeter sieve, within 18 months after first and continuous exposure to water and sealant-degrading microorganisms.

20. The article of claim 17, wherein the biodegradable sealant of the first package is selected from the group consisting of polyhydroxyalkanoate (PHA), PHA coated paper, PHA coated vacuum metallized paper, vacuum metallized PHA, polyvinyl alcohol, aliphatic aromatic polyester, thermoplastic starch, polybutylene succinate, copolymers of polybutylene succinate, starch-based film, and mixtures thereof.

* * * * *